United States Patent [19]

Kaneko et al.

[11] Patent Number: 4,701,214
[45] Date of Patent: Oct. 20, 1987

[54] METHOD OF PRODUCING IRON USING ROTARY HEARTH AND APPARATUS

[75] Inventors: Dentaro Kaneko, Matthews; David C. Meissner, Charlotte, both of N.C.

[73] Assignee: Midrex International B.V. Rotterdam, Zurich, Switzerland

[21] Appl. No.: 857,684

[22] Filed: Apr. 30, 1986

[51] Int. Cl.$^4$ .......................... C21B 13/08; F27B 3/06
[52] U.S. Cl. .......................................... 75/38; 75/40; 266/144; 266/160; 266/177
[58] Field of Search .......................... 75/38, 40, 144; 266/160, 177

[56] References Cited

U.S. PATENT DOCUMENTS 3,452,972 7/1969 Beggs ................................. 266/183
4,008,074 2/1977 Rossner et al. .................... 75/38
4,448,402 5/1984 Weber et al. ...................... 75/38

Primary Examiner—Melvyn J. Andrews
Attorney, Agent, or Firm—Ralph H. Dougherty

[57] ABSTRACT

A method of producing iron from finely divided iron oxide comprising the steps of: mixing iron oxide or iron ore fines with finely divided coal and a binder to form a mixture, agglomerating the mixture by compacting, pelletizing, or briquetting the mixture to form agglomerates or pellets, introducing the pellets to a rotary hearth furnace to prereduce the iron in the pellets, introducing the prereduced pellets into a smelting reduction vessel as the metallic charge constituent, introducing particulate carbonaceous fuel and oxygen to the smelting reduction vessel through the bottom of the vessel to react with the melt or bath within the vessel, reduce the iron to elemental iron and form an off gas containing CO and $H_2$, introducing the off-gas into the rotary hearth furnace as process gas to prereduce the pellets therein, and drawing off the hot metal from the smelting reduction vessel.

The prereduced compacts are preferably discharged from the rotary hearth furnace at a temperature of at least 1000° C. into the smelting reduction vessel to form the molten iron product.

24 Claims, 3 Drawing Figures

METHOD OF PRODUCING IRON USING ROTARY HEARTH AND APPARATUS

BACKGROUND OF THE INVENTION

This invention relates to the production of iron from iron oxide in the form of fines or concentrates by agglomerating the iron oxide with a solid carbonaceous reductant, heating and reducing the agglomerates in a rotary hearth furnace, and smelting the reduced agglomerates.

The invention is more particularly described as a method of making iron from finely divided iron ores, by the steps of agglomerating finely divided iron ore to form compacts, prereducing the compacts in a rotary hearth furnace, discharging the prereduced compacts at a temperature of at least 1000° C., and smelting and further reducing the prereduced compacts in a smelting reduction vessel to form a molten iron product.

Currently, commercial processes for direction reduction use a shaft furnace, fluidized bed furnace or a rotary kiln. Both the shaft furnace and rotary kiln require an indurated agglomerate or lump ore as feed material. Both the shaft furnace and the fluid bed furnace tend to have sticking or clustering problems, and rotary kilns having ringing problems in which the burden tends to adhere to the side of the kiln. These sticking problems are increased when heating to higher reduction temperatures. However, higher temperatures are preferable in order to increase the rate of reduction reactions. We have found that higher operating process temperatures (above the temperature at which particles stick together) are possible when utilizing a rotary hearth furnace for direct reduction or prereduction, since the particles on the rotary hearth are not in intimate contact, particularly when the bed is only one or two particles deep. The upper layer of particles is not sufficiently heavy to cause particles on the upper layer to stick to particles in the lower layer.

Rotary hearth furnace operation require a gas containing a high percentage of reductants ($CO+H_2$). Such a gas is normally referred to as a high quality gas. "Quality" is defined as the ratio of reductants ($CO+H_2$) to oxidants ($CO_2+H_2O$) in the gas. Rotary hearth furnace operation normally requires a high quality gas. However, in the present invention such a high quality gas is not required because the reductant, solid carbonaceous material, is contained in the agglomerate being reduced in the rotary hearth furnace. A gas quality of 2.4 is sufficient to prevent reoxidation of the reduced iron in the rotary hearth furnace, because such gas will be in equilibrium with iron at 1200° C. Reduction of iron oxide in a rotary hearth furnace is fairly rapid because of the extremely high temperatures involved and the intimate contact of iron oxide with solid reductant in the agglomerated feed material on the hearth. When more than a single layer of agglomerated particles are reduced in a rotary hearth furnace, there is a marked degree of difference in reduction between the layers. The uppermost layer reaches reduction temperature first, and consequently achieves high metallization in a short period of time. Lower layers, being shielded from direct heat radiation, take a longer time to reach processing temperature, and therefore take a longer time to achieve the desired metallization. During the period of time after the top layer has achieved its desired metallization and while the lower layers are increasing in metallization is a critical time to the uppermost layer if the furnace gases or oxidizing to iron. This will cause a loss of metallization of the topmost layer while the lower layers are undergoing reduction. To prevent this loss in metallization in the uppermost layers, a rotary hearth furnace can be operated with burners adjusted for rich operation to produce a gas which is in equilibrium with metallic iron. Producing such gas is extremely difficult to achieve with coal in the burners. However, this atmosphere can be readily produced with a gaseous or liquid fuel and preheated air.

We have found that utilizing off-gas from a smelting reduction vessel in the rotary hearth will overcome the foregoing difficulties and allow the operation of the rotary hearth furnace with 100% off-gas rather than requiring additional gaseous or liquid fuels.

OBJECTS OF THE INVENTION

It is the principal object of this invention to provide a process for making molten iron from iron ore in the form of fines.

It is also an object of this invention to provide a method for making iron from agglomerated iron oxide fines in which carbon for reduction of iron oxide is present in the agglomerates.

It is also an object of this invention to provide a method for producing iron in which a substantial portion of the carbon necessary for final reduction in a smelting furnace is provided in the reduced iron as fed into a smelting reduction furnace.

It is another object of this invention to provide a process for making iron from agglomerates in a rotary hearth furnace and a smelting vessel utilizing coal as fuel in the smelting vessel, and without any outside fuel requirement other than coal.

It is a further object of this invention to provide a process for making iron from oxide fines, wherein a rotary hearth furnace acts as a prereducing apparatus without being fired by coal or gaseous or liquid fuel.

SUMMARY OF THE INVENTION

These and other objects are readily achieved by the present invention in which finely divided iron oxide and finely divided carbonaceous material are thoroughly mixed, then agglomerated. The agglomerates are fed to a rotary hearth furnace at high temperature wherein the iron oxide is reduced to a highly metallized product and the carbonaceous material is devolatilized, with a substantial portion being reacted. The resulting hot, highly reduced iron containing some carbon is the feed material for a smelting furnace such as an underbath blown smelting and reduction furnace, in which the final melting and refining is accomplished.

BRIEF DESCRIPTION OF THE DRAWINGS

The foregoing objects are better understood by reference to the following detailed description and the appended drawings, in which.

DETAILED DESCRIPTION

Figure 1:
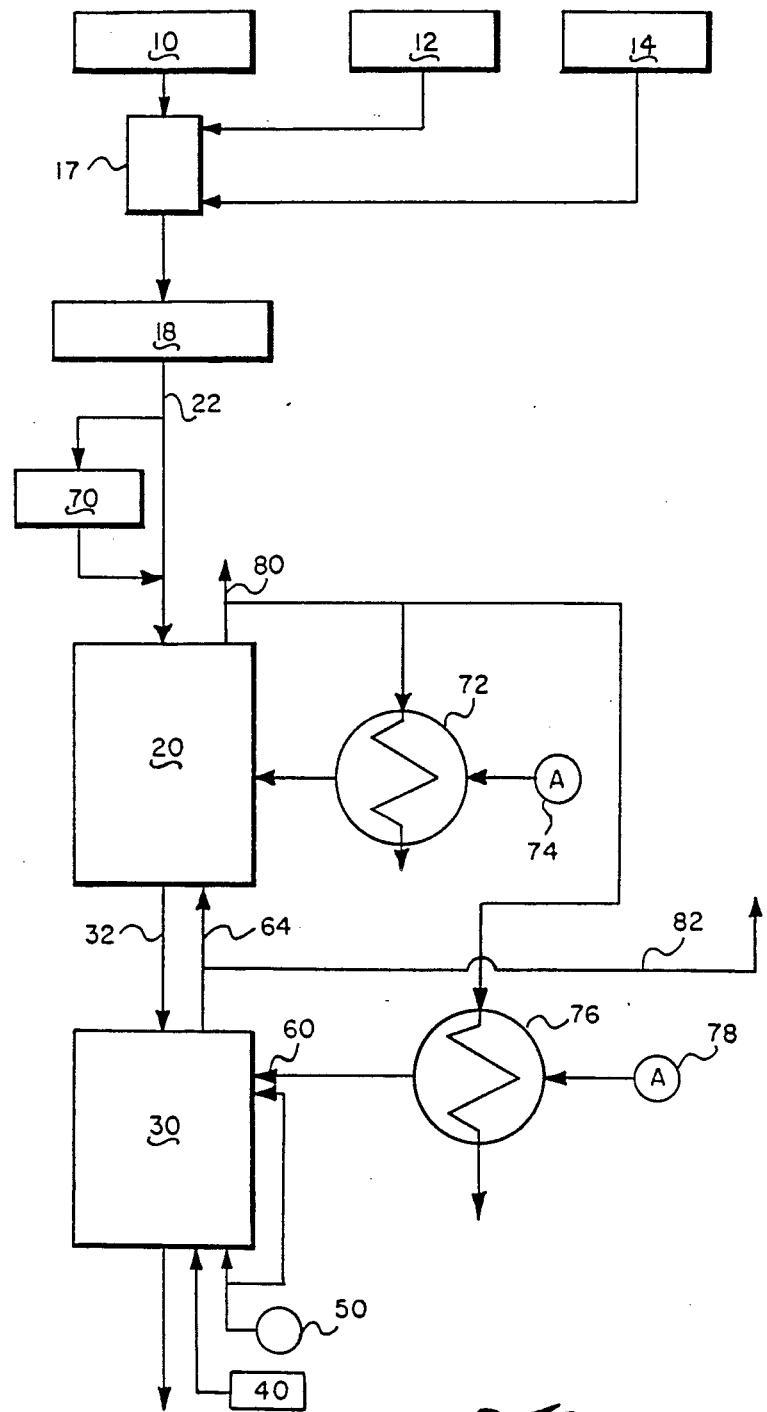
FIG. 1 is a schematic flow sheet of the invented process showing the required equipment and its general arrangement.
Figure 2:
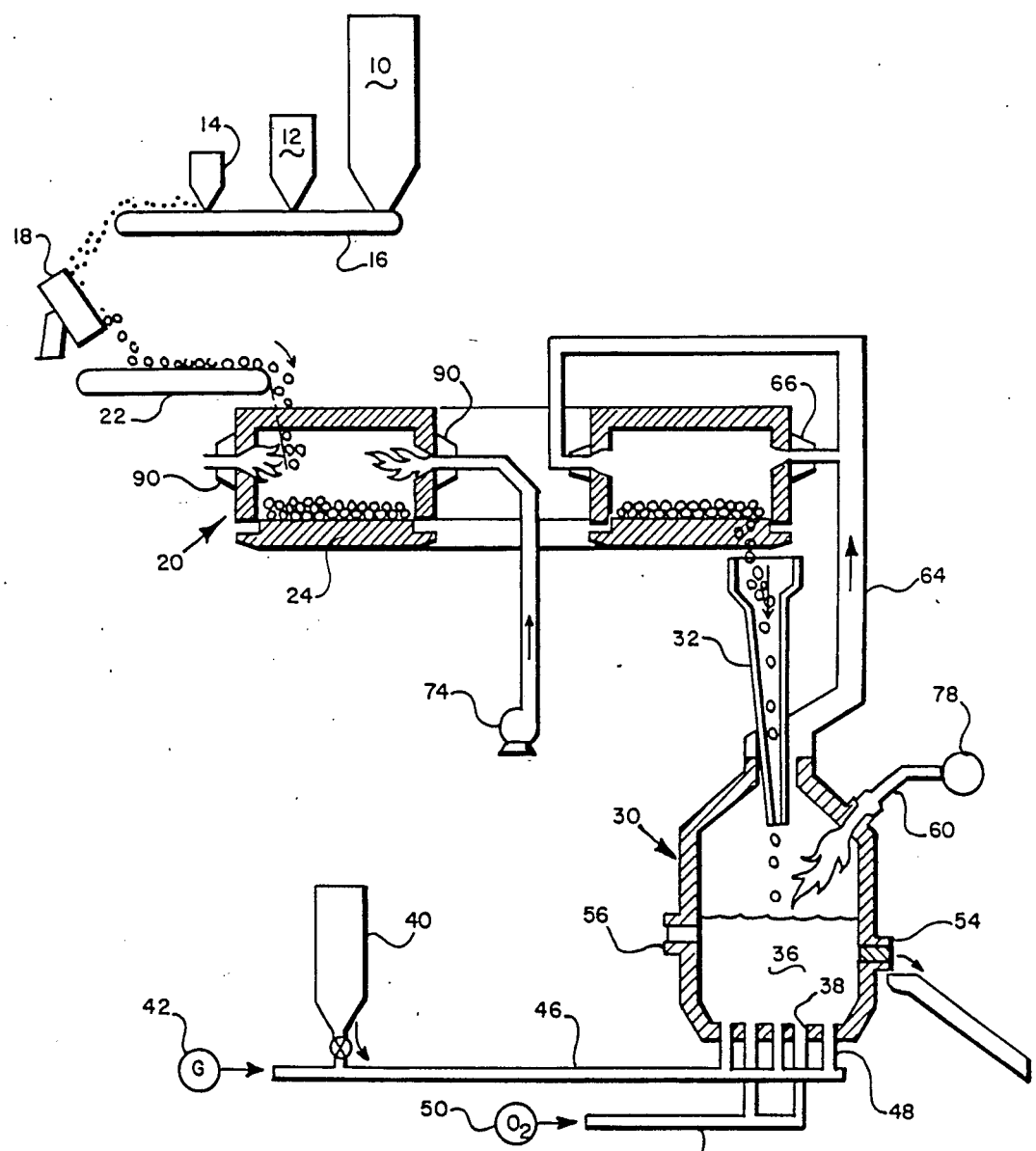
FIG. 2 is a vertical cross section through each major piece of equipment showing a preferred arrangement of the apparatus.

Referring now to the drawings, iron ore from bin 10, coal fines from bin 12, and a binder from bin 14, are fed by a conveyor 16 to a mixer 17, then to an agglomerator or pelletizer 18, such as a balling drum or a pelletizing disc. The agglomerated pellets are introduced to rotary hearth furnace 20 by conveyor 22 and are spread on the movable hearth 24 by any standard spreading means. Prereduced pellets pass from the rotary hearth furnace 20 to smelting reduction vessel 30 by charge chute 32 or any other suitable charging apparatus. The prereduced pellets fall into molten metal bath 36. The smelting reduction vessel has one or more bottom inlets 38 for bottom blowing of oxygen and particulate carbonaceous fuel, such as coal fines from bin 40. Carrier gas, such as nitrogen or cooled off-gas recycled from the smelting reduction vessel, from source 42 moves the coal through gas pipe 46 and tuyeres 48 into the bath. Oxygen from source 50 and pipe 52 is also blown into the bath, usually through a separate set of tuyeres. The smelting reduction vessel is provided with a hot metal tap hole 54 and a slag notch 56, as required.

When oxygen is introduced beneath the bath, an oxygen port 60 should also be provided in the upper portion of the smelting reduction vessel to provide the remaining oxygen necessary for complete reaction with the carbon in the bath. The port 60 is directed downwardly to impinge on the bath, thus promoting bath circulation and contact by the oxygen with carbon contained in the bath, to assure complete reaction of the carbon. For 100 parts of oxygen introduced below the surface of the bath, from 15 to 30 parts should be injected through port 60 for the purpose of post combustion.

Alternatively, preheated air can be utilized to provide the oxygen for reaction with the carbon. Air is provided only above the bath through port 60. In this case, no oxygen in any form is required to be introduced below the surface of the bath.

A gas off-take 64 encloses the top of the vessel 30 and communicates with rotary hearth furnace gas ports 66 to provide gas for combustion within the rotary hearth furnace 20.

A dryer 70 can be interposed between the pelletizer and the rotary hearth furnace, if desired, to provide a drier agglomerate, i.e. a pellet having less moisture content than normal.

Off-gas from the rotary hearth furnace can pass through a heat exchanger 72 for preheating combustion air from source 74 to the rotary hearth furnace, or through heat exchanger 76 to preheat combustion air from source 78 to the smelting reduction vessel, or both, as shown in FIG. 1. Off-gas 80 from the rotary hearth furnace and/or off-gas from the smelting reduction vessel from line 82 can be used for additional heating to the local area, such as to dryer 70.

In operation, iron oxide or iron ore in the form of fines or concentrate is fed from bin 10 into mixer 17 along with finely divided solid reductant from bin 12 to form a mixture. The solid reductant can be coal, coke breeze, charcoal fines or other carbonaceous material. Additives such as desulfurizing or binding agents from bin 14 may be added to the mixture, if desired, along with any necessary moisture addition. Such additives include lime and bentonite or other suitable binder. Lime will act as a desulfurizer in the smelting furnace. Bentonite acts as a binder. Sufficient lime should be added to mixer 17 to maintain a basicity ratio of at least 1.5. The mixture is then fed from mixer 17 into an agglomeration unit such as pelletizer 18. The green or wet pellets produced in the pelletizer 18 may be dried in dryer 70 or they may by-pass the dryer 70 and be fed directly into rotary hearth furnace 20 by means of conveyor 22.

When materials containing a high proportion of slimes are used to form agglomerates, the agglomerates must be dried before being fed to the rotary hearth furnace in order to prevent distintegration, as it is difficult for fines to penetrate the slag layer in the smelting vessel. The dryer 70 is a totally optional unit. It has been our experience that when dried agglomerates are fed in a single layer to a rotary hearth furnace 20, coal devolatilization and iron-oxide reduction to greater than 90% metallization will take place in from about 8 to about 15 minutes when the reduction zone temperature is between 2300° F. and 2500° F. Off-gass from the smelting vessel (SRV) provides both sensible heat and chemical heat for combustion in the rotary hearth furnace. The reductant is already present in the pellets or agglomerates as fine carbon particles. Thus, it is unnecessary to upgrade the quality of the off-gas in such manner as must be done in either a shaft furnace or a fluidized bed furnace.

Figure 3:
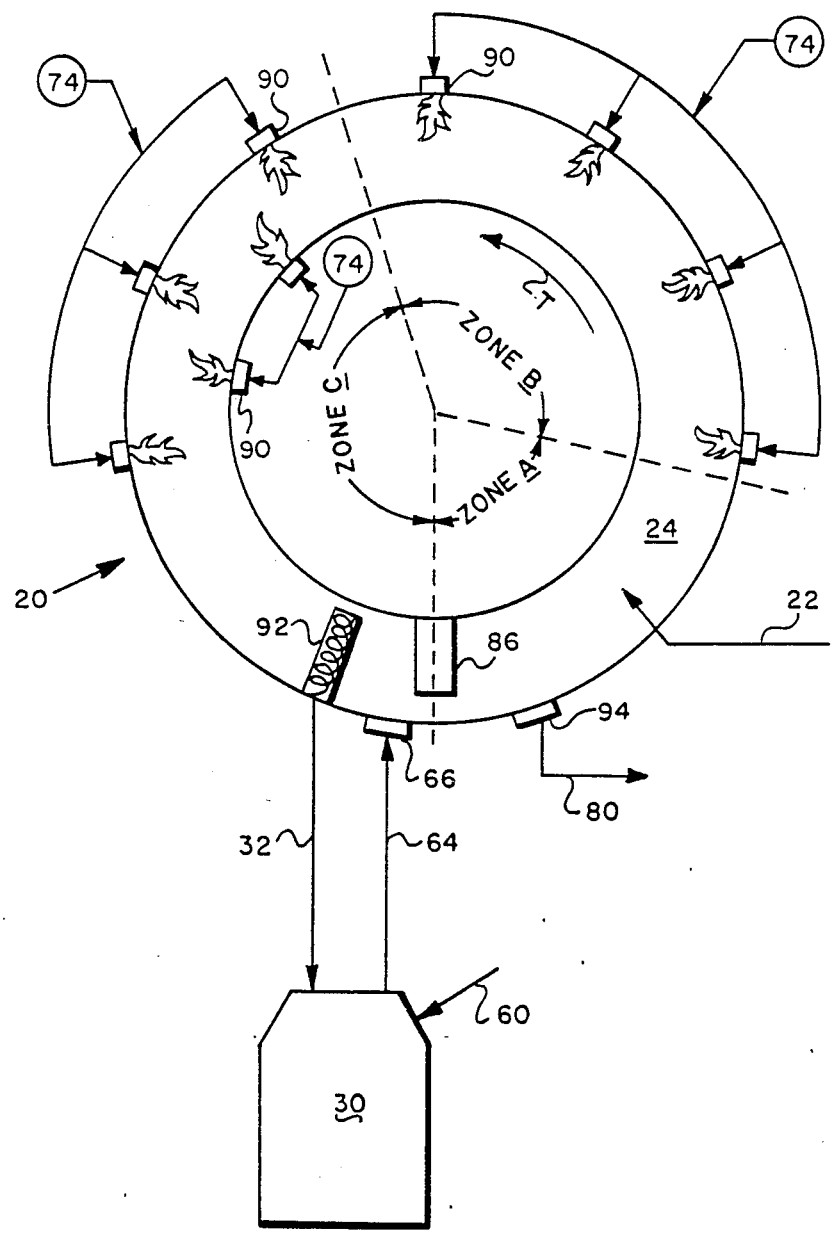
FIG. 3 is schematic diagram showing a rotary hearth furnace in greater detail, along with a smelting reduction vessel, operated in accordance with the invention.

Rotary hearth furnaces are often characterized as having several distinct zones of operation therein. As shown in FIG. 3, arrow T indicates the direction of travel of the hearth 24. The first zone, Zone A, is usually characterized as a drying/devolatilization zone, Zone B as a heating zone, and Zone C as a reduction zone. A curtain wall 86 divides Zones A and C to prevent gases from commingling between these zones. Agglomerates are placed on the hearth 24 at Zone A from conveyor 22. SRV off-gas from line 64 enters the rotary hearth furnace 20 through inlet ports 66 at a temperature of about 1250° to 1400° C., and moves through the furnace in the direction opposite to hearth rotation. Sensible heat is imparted to the agglomerates first to raise their temperature. Preheated air from sources 74 is introduced through ports 90 to combust the gases in the furnace. After passing through all zones of the furnace and being prereduced at least 50%, the agglomerates are discharged by a discharge device 92, such as a screw conveyor. Off-gas 80 from the rotary hearth furnace is removed through port 94. When green pellets are fed to the rotary hearth without first being dried, Zone A constitutes a devolatilization and drying zone. In such case, the time for reduction in the rotary hearth furnace will be increased 20 to 25% at a temperature from 2300° to 2500° F. to achieve a metallization of at least 90%.

The hot prereduced pellets, greater than 90% metallized and at a temperature of about 2000° F. are fed to smelting reduction furnace 30, in which the agglomerates are melted to form a bath of molten metal 36 under a layer of slag. The molten metal is drawn off at taphole 54 and the slag is removed at slag notch 56. The agglomerates contain some residual carbon which is available for final reduction in the smelting furnace. It also promotes rapid reactions because it is hot and uniformly dispersed. Since the agglomerates contain carbon and are introduced to the smelting furnace at such a high temperature, the furnace has a reduced energy requirement per ton of hot metal produced over known iron making processes.

The coal utilized for agglomeration in the process should be finely divided, preferably ground. For agglomeration by pelletizing, all coal particles should be less than 100 microns. For agglomeration by briquetting, the coal particles should be all less than 1 millimeter. The coal introduced to the smelting reduction vessel through the tuyeres should be finely divided, and preferably all less than 1 millimeter in size.

In its broadest form, the method of the invention comprises mixing particulate iron oxide with solid carbonaceous reductant to form a mixture, agglomerating the mixture, then feeding the agglomerates to a rotary hearth furnace to form a shallow bed of agglomerates from one to three or more layers deep, heating the agglomerate bed to a temperature of from 2000° F. to 2600° F. (1100° to 1370° C.) for from about 5 to about 45 minutes, preferably about 10 to about 30 minutes, to effect drying, heating and prereduction of at least 50%, removing the hot reduced agglomerates from the rotary hearth furnace and feeding them into a smelting furnace wherein they are smelted and reduced to form molten iron, which is then recovered from the smelting furnace, feeding coal fines and oxygen into the smelting furnace beneath the surface of the molten metal bath as reactants, drawing off the off-gas from the smelting furnace, and burning the removed off-gas as fuel in the rotary hearth furnace.

In an alternative embodiment of the invented method, preheated air is injected into the smelting reduction vessel above the bath through port 60, and the air is so directed to impinge onto the surface of the bath. In this embodiment, no oxygen and no air, neither preheated nor at ambient temperature, is injected beneath the surface of the bath. The only gas injected beneath the surface is the carrier gas carrying the coal fines.

The following Table shows the typical operating parameters of the process under various conditions.

TABLE

| Case | 1 | 2 | 3 | 4 |
| --- | --- | --- | --- | --- |
| Oxidant to SRV | Air | Air | $O_2$ | $O_2$ |
| Oxidant Temperature to SRV (°C.) | 1200 | 1200 | 25 | 25 |
| % Metallization in RHF | 70 | 90 | 70 | 90 |
| Gas Flow - SRV to RHF ($Nm^3/t$) | 1294 | 1010 | 601 | 458 |
| Oxygen Flow to SRV ($Nm^3/t$) | 0 | 0 | 204 | 166 |
| Coal to RHF (G-Cal/t) | 2.67 | 3.15 | 2.67 | 3.15 |
| Coal to SRV (G-cal/t) | 2.18 | 1.66 | 2.31 | 1.79 |
| Total Coal (G-cal/t) | 4.85 | 4.81 | 4.98 | 4.94 |
| SRV gas to RHF | 1400° C. | All Cases | | |
| DRI to SRV | 1100° C. | All Cases | | |
| Combustion Air to RHF | 650° C. | All Cases | | |

SUMMARY OF THE ACHIEVEMENTS OF THE OBJECTS OF THE INVENTION

From the foregoing it is readily apparent from that we have invented a process for the production of iron requiring less energy than is presently required per ton of hot metal and a smaller smelting furnace for a given rate of throughput.

What is claimed is:

1. Apparatus for making iron from finely divided iron ores, comprising:
   a. means for agglomerating finely divided iron ore and particulate carbonaceous material to form compacts;
   b. a rotary hearth furnace for prereducing said compacts therein;
   c. means for introducing said compacts to said rotary hearth furnace;
   d. means for heating and prereducing said compacts within said rotary hearth furnace;
   e. means for discharging said prereduced compacts from said rotary hearth into a smelting reduction vessel at a temperature of at least 1000° C.;
   f. a smelting reduction vessel;
   g. means for introducing finely divided carbonaceous material into said vessel beneath the surface of the bath therein;
   h. means for removing an off-gas from said smelting reduction vessel; and
   i. means for introducing all of said off-gas to said rotary hearth furnace as process gas for heating and prereducing said compacts.

2. A method of making iron from finely divided iron ores wherein all reductant and fuel is provided by solid carbonaceous material, comprising:
   a. agglomerating finely divided iron ore and particulate carbonaceous material to form compacts;
   b. prereducing said compacts in a rotary hearth furnace;
   c. discharging said prereduced compacts from said rotary hearth at a temperature of at least 1000° C.;
   d. forming a molten metal bath in a smelting reduction vessel;
   e. introducing finely divided carbonaceous material into said vessel beneath the surface of the bath therein;
   f. smelting and reducing the prereduced compacts in said smelting reduction vessel and forming an off-gas; and
   g. introducing all of said off-gas to said rotary hearth furnace as fuel for prereducing said compacts, whereby both sensible heat and chemical heat value of the off-gas is utilized in prereducing said compacts.

3. A method according to claim 2, wherein said agglomerating step is briquetting.

4. A method according to claim 2, wherein said agglomerating step is pelletizing.

5. A method according to claim 4, wherein said pelletizing is accomplished by balling in a balling drum.

6. A method according to claim 2, further comprising mixing said finely divided iron ore and particulate carbonaceous material with a binder prior to agglomeration.

7. A method according to claim 6, wherein said binder is selected from the group consisting of: lime and bentonite.

8. A method according to claim 6, wherein sufficient lime is added to maintain a basicity ratio of at least 1.5.

9. A method according to claim 2, wherein the particulate carbonaceous material is selected from the group consisting of coal, coke, breeze, and charcoal fines.

10. A method according to claim 2, further comprising introducing oxygen into said smelting furnace beneath the surface of the bath therein.

11. A method according to claim 10, further comprising introducing additional oxygen into said smelting furnace above the surface of the bath to promote combustion.

12. A method according to claim 11, wherein said additional oxygen is caused to impinge on the bath surface to cause turbulence thereof.

13. A method according to claim 11, wherein from 15 to 30 parts of oxygen are introduced above the bath for each 100 parts of oxygen introduced beneath the surface of the bath.

14. A method according to claim 2, further comprising introducing air into said smelting furnace above the surface of the bath to promote reaction of oxygen contained therein with carbon to form carbon monoxide and carbon dioxide.

15. A method according to claim 14, further comprising preheating said combustion air.

16. A method according to claim 2, further comprising introducing air to the rotary hearth furnace to promote combustion therein.

17. A method according to claim 16, further comprising preheating said combustion air.

18. A method according to claim 2, further comprising drying said compacts prior to the prereducing step.

19. A method according to claim 2, wherein said pellets are from about 10 mm to about 25 mm in diameter.

20. A method according to claim 2, wherein said briquets are no greater than about 15 mm in thickness.

21. A method according to claim 2, wherein said coal is finely divided.

22. A method according to claim 21, wherein the particle size of said coal is from about 10 microns to about 1 mm.

23. A method of producing iron from finely divided iron oxide comprising:
   mixing iron oxide or iron ore fines with finely divided coal and a binder to form a mixture;
   pelletizing said mixture;
   introducing pellets to a rotary hearth furnace to prereduce the iron in the pellets;
   passing said prereduced pellets into a smelting reduction vessel;
   introducing particulate carbonaceous fuel to the refining vessel through the bottom thereof to react with the melt within the vessel, to reduce the iron to elemental iron and to form an off-gas containing CO and $H_2$;
   introducing all of said off-gas to the rotary hearth furnace as process gas to heat and prereduce the pellets therein; and
   drawing off the hot metal from the smelting reduction vessel;
   whereby particulate carbonaceous material provides the sole source of reductant and heating values.

24. A method according to claim 23 further comprising introducing oxygen-containing gas to said vessel as a source of oxygen to react with the carbon in the bath.

* * * * *